United States Patent
Swanick et al.

(10) Patent No.: US 10,301,057 B2
(45) Date of Patent: May 28, 2019

(54) DISPENSING CONTAINER WITH INTERNAL SQUEEZE LIMITING MEMBER

(71) Applicant: CALIBRE CLOSURES, LLC, Roselle, IL (US)

(72) Inventors: Ken P. Swanick, Arlington Heights, IL (US); Douglas J. Mulay, Downers Grove, IL (US)

(73) Assignee: CALIBRE CLOSURES LLC, Downers Grove, IL (US)

( * ) Notice: Subject to any disclaimer, the term of this patent is extended or adjusted under 35 U.S.C. 154(b) by 0 days.

(21) Appl. No.: 15/414,832

(22) Filed: Jan. 25, 2017

(65) Prior Publication Data
US 2018/0009563 A1    Jan. 11, 2018

Related U.S. Application Data

(60) Provisional application No. 62/360,861, filed on Jul. 11, 2016.

(51) Int. Cl.
| | | |
|---|---|---|
| *G01F 11/28* | (2006.01) | |
| *B65D 1/32* | (2006.01) | |
| *B65D 47/08* | (2006.01) | |

(52) U.S. Cl.
CPC ......... *B65D 1/323* (2013.01); *B65D 47/0838* (2013.01); *G01F 11/28* (2013.01); *G01F 11/282* (2013.01); *G01F 11/288* (2013.01)

(58) Field of Classification Search
CPC .......... B65D 1/32; B65D 1/095; B65D 1/323; B65D 1/0261; B65D 1/0276; B65D 11/12; B65D 35/14; B65D 35/40; B65D 57/00; B65D 83/00

USPC ................ 222/464.1, 464.7, 464.2
See application file for complete search history.

(56) References Cited

U.S. PATENT DOCUMENTS

| | | | |
|---|---|---|---|
| 1,250,081 A | 12/1917 | Bennis | |
| 1,259,057 A | 3/1918 | Vick | |
| 2,701,668 A | 2/1955 | Zayan | |
| 2,864,367 A | 12/1958 | Mende | |
| 2,971,664 A | 2/1961 | Jacob | |
| 3,089,626 A | 5/1963 | Kubiliunas | |
| 3,123,258 A | 3/1964 | Schiltz | |
| 3,227,317 A | 1/1966 | Bereziat et al. | |
| 3,319,837 A * | 5/1967 | Mueller | B05B 11/004 |
| | | | 215/382 |
| 3,366,284 A * | 1/1968 | Marona | G01F 11/082 |
| | | | 222/211 |

(Continued)

FOREIGN PATENT DOCUMENTS

| | | |
|---|---|---|
| EP | 340835 | 11/1989 |
| JP | H03-176359 | 7/1991 |
| WO | 2009/151106 | 12/2009 |

*Primary Examiner* — Patrick M. Buechner
(74) *Attorney, Agent, or Firm* — Barnes & Thornburg LLP (57) ABSTRACT

A vessel configured to contain a powder, semi-solid or liquid product and to dispense predetermined amounts of the product. The vessel includes a container, a limiting member, and a dispensing closure. The container, limiting member and dispensing closure are not integral with each other, are constructed as discrete components, and are assembled to form the vessel. The limiting member limits inward deflection of the container during each squeezing of the container to limit the amount of product displaced from the container into the dispensing closure.

15 Claims, 6 Drawing Sheets

(56) References Cited

U.S. PATENT DOCUMENTS

| | | | |
|---|---|---|---|
| 3,369,707 A | 2/1968 | Porter et al. | |
| 3,383,007 A | 5/1968 | Salamone | |
| 3,409,181 A * | 11/1968 | McDonnell | B65D 1/323 222/211 |
| 3,419,181 A | 12/1968 | Stec | |
| 3,459,315 A | 8/1969 | Labarre | |
| 3,472,411 A | 10/1969 | Turner | |
| 3,511,401 A * | 5/1970 | Lachner | B65D 1/0276 215/373 |
| 3,523,637 A | 8/1970 | Stec | |
| 3,581,605 A | 6/1971 | Taylor | |
| 3,653,546 A | 4/1972 | Hazard | |
| 3,659,750 A | 5/1972 | La Vange | |
| 3,734,359 A | 5/1973 | Waterman | |
| 3,762,432 A | 10/1973 | Peterson, Jr. | |
| 3,774,822 A | 11/1973 | Hazard | |
| 4,221,291 A | 9/1980 | Hunt | |
| 4,271,984 A | 6/1981 | Ducros et al. | |
| 4,345,696 A | 8/1982 | Guimarin | |
| 4,452,382 A | 6/1984 | Von Holdt | |
| 4,506,809 A | 3/1985 | Corsette | |
| 4,519,529 A | 5/1985 | Seltz | |
| 4,682,702 A | 7/1987 | Gach | |
| 4,724,978 A | 2/1988 | Cleevely et al. | |
| 4,747,497 A | 5/1988 | Holman | |
| 4,747,498 A | 5/1988 | Gach | |
| 4,815,618 A | 3/1989 | Gach | |
| 4,867,593 A * | 9/1989 | Kurokawa | A45D 34/042 222/212 |
| 4,883,192 A | 11/1989 | Krugman | |
| 5,020,681 A | 6/1991 | Kusz | |
| 5,065,881 A | 11/1991 | Tarng | |
| 5,141,138 A | 8/1992 | Odet et al. | |
| 5,288,614 A | 2/1994 | Bodenmuller et al. | |
| 5,337,924 A | 8/1994 | Dickie | |
| 5,361,947 A | 11/1994 | Lifshey | |
| 5,398,829 A | 3/1995 | Stubbs | |
| 5,402,904 A | 4/1995 | Close | |
| 5,467,888 A | 11/1995 | Brandstrom et al. | |
| 5,482,176 A | 1/1996 | Maietta et al. | |
| 5,579,943 A | 12/1996 | Johnson | |
| 5,582,330 A | 12/1996 | Iba | |
| 5,624,057 A * | 4/1997 | Lifshey | A61F 9/0008 222/212 |
| 5,692,633 A | 12/1997 | Gordon | |
| 5,755,360 A | 5/1998 | Elliott | |
| 5,797,521 A | 8/1998 | Sobral | |
| 5,875,942 A | 3/1999 | Ohmi et al. | |
| 5,897,033 A | 4/1999 | Okawa et al. | |
| 6,041,975 A | 3/2000 | Flak | |
| 6,089,411 A | 7/2000 | Baudin et al. | |
| 6,116,455 A * | 9/2000 | Rossman | B65D 81/365 220/23.83 |
| 6,334,555 B1 | 1/2002 | Randall et al. | |
| 6,367,622 B1 | 4/2002 | Hsu | |
| 6,422,412 B1 | 7/2002 | Sagawa | |
| 6,471,101 B1 | 10/2002 | Vardanyan | |
| 6,477,743 B1 | 11/2002 | Gross et al. | |
| 6,484,909 B1 | 11/2002 | Valpuesta Landa | |
| 6,513,650 B2 | 2/2003 | Mollstam et al. | |
| 6,571,994 B1 | 6/2003 | Adams et al. | |
| 6,679,375 B1 | 1/2004 | Coory | |
| 6,702,161 B2 | 3/2004 | Adams et al. | |
| 6,745,923 B2 | 6/2004 | Julian | |
| 6,755,357 B2 * | 6/2004 | Duqueroie | B05B 11/047 222/107 |
| 6,769,579 B2 | 8/2004 | Milian | |
| 6,786,330 B2 | 9/2004 | Mollstam et al. | |
| 6,793,101 B2 | 9/2004 | Shinozaki et al. | |
| 6,793,104 B2 | 9/2004 | Kao | |
| 6,851,576 B2 | 2/2005 | Dubach | |
| 6,896,161 B2 | 5/2005 | Patz | |
| 6,976,576 B2 | 12/2005 | Intini | |
| 7,134,576 B2 | 11/2006 | Gringer et al. | |
| 7,178,683 B2 | 2/2007 | Birkmayer et al. | |
| 7,207,465 B2 | 4/2007 | Weist | |
| 7,261,226 B2 | 8/2007 | Adams et al. | |
| 7,337,921 B2 | 3/2008 | Ma | |
| 7,367,964 B2 | 5/2008 | Heinz et al. | |
| D571,199 S | 6/2008 | Petrosino et al. | |
| 7,410,071 B1 | 8/2008 | Seib et al. | |
| 7,635,070 B2 | 12/2009 | Cohen et al. | |
| 7,934,615 B2 | 5/2011 | Hoffman et al. | |
| 8,459,502 B2 | 6/2013 | Swanick | |
| 8,544,685 B2 | 10/2013 | Swanick | |
| 8,646,659 B2 | 2/2014 | Swanick | |
| 2003/0000963 A1 | 1/2003 | Julian | |
| 2003/0010781 A1 | 1/2003 | Odet | |
| 2003/0106911 A1 | 6/2003 | Adams et al. | |
| 2004/0149778 A1 | 8/2004 | Altonen et al. | |
| 2006/0000793 A1 | 1/2006 | Mavin et al. | |
| 2006/0057257 A1 | 3/2006 | Ma | |
| 2006/0108378 A1 | 5/2006 | Cohen et al. | |
| 2006/0249474 A1 | 11/2006 | Sawyer et al. | |
| 2007/0017939 A1 | 1/2007 | Conroy et al. | |
| 2007/0034648 A1 | 2/2007 | Mathiez | |
| 2007/0045134 A1 | 3/2007 | Dvorak et al. | |
| 2007/0181522 A1 | 8/2007 | Davidson | |
| 2008/0078775 A1 | 4/2008 | Steiger et al. | |
| 2008/0124432 A1 | 5/2008 | Ma | |
| 2008/0156802 A1 | 7/2008 | Yauk et al. | |
| 2008/0272084 A1 | 11/2008 | Lohrman et al. | |
| 2009/0020495 A1 | 1/2009 | Cheng | |
| 2009/0050648 A1 | 2/2009 | Wisniewski | |
| 2010/0308082 A1 | 12/2010 | Lamble et al. | |
| 2011/0049188 A1 | 3/2011 | Parisi et al. | |
| 2011/0100948 A1 | 5/2011 | Lohrman et al. | |
| 2011/0204095 A1 * | 8/2011 | Iwatsubo | B65D 1/32 222/158 |
| 2012/0031277 A1 * | 2/2012 | Hsieh | A47J 31/0626 99/289 R |
| 2013/0048679 A1 * | 2/2013 | Swanick | B65D 1/32 222/206 |

* cited by examiner

FIG. 10

DISPENSING CONTAINER WITH INTERNAL SQUEEZE LIMITING MEMBER

CROSS REFERENCE TO RELATED APPLICATIONS

This application claims the benefit of priority under 35 U.S.C. § 119(e) to U.S. Provisional Patent Application No. 62/360,861, filed Jul. 11, 2016. The disclosure set forth in the referenced application is incorporated herein by reference in its entirety.

The present disclosure relates to a vessel and methods for containing powders, semi-solids or liquids and, more specifically, relates to vessels and methods for dispensing predetermined amounts of powders, semi-solids, or liquids.

SUMMARY

The present disclosure relates to a vessel and methods configured to contain a powder, semi-solid or liquid product and to dispense predetermined amounts of the product. The vessel is similar in certain respects to the vessel disclosed in U.S. Pat. No. 8,646,659, which is incorporated herein by reference except as relating to the limiting and the manner of assembling the vessel. With the present disclosure, the limiting member is not integral with the container or the dispensing closure and is held in place within the container by the dispensing closure and a bottom of the inside of the container.

Features and advantages of the disclosure will be set forth in part in the description which follows and the accompanying drawings described below, wherein one or more embodiments of the disclosure is described and shown, and in part will become apparent upon examination of the following detailed description taken in conjunction with the accompanying drawings.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements. The present invention and the advantages thereof will become more apparent upon consideration of the following detailed description when taken in conjunction with the accompanying drawings.

DETAILED DESCRIPTION

The following detailed description includes references to the accompanying figures. In the figures, similar symbols typically identify similar components, unless context dictates otherwise. The example embodiments described herein are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

Figure 1:
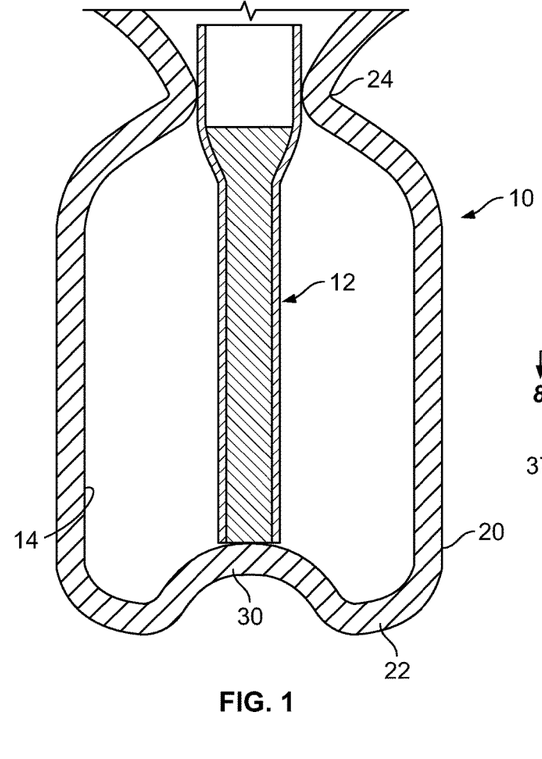
FIG. 1 is a cross section view of a container of a vessel in accordance with some embodiments of the present disclosure.

The present disclosure is directed to a vessel configured to contain powder, semi-solid or liquid product and to dispense predetermined amounts of the product and a method for assembling the vessel. FIG. 1 illustrates a vessel that includes a container 10, a limiting member 12, and a dispensing closure (shown in FIG. 10 and described further throughout this disclosure and in reference to U.S. Pat. No. 8,646,569). The container 10, limiting member 12 and dispensing closure are not integral with each other. The container 10, the dispensing closure, and the limiting member 12 are constructed as discrete components, and are assembled to form the vessel. In accordance with some embodiments of the present disclosure, the dispensing closure is formed by blow molding and the container 10 and the limiting member 12 are formed by injection molding. However, in other embodiments, the dispensing closure, container 10, and limiting member 12 may be formed in any suitable manner, such as injection molding, blow molding, thermoforming, casting, or others.

The container 10 defines a bore 14 for receiving the product. The container 10 includes a peripheral wall 20 and a bottom 22 that defines the bore 14. The container 10 defines a top opening. The peripheral wall also has a neck 24 at or adjacent the top opening of the container 10. The container 10 may have any suitable configuration. For example, the peripheral wall 20 may be rounded along all or some of its periphery or may be flat along some or all of its periphery. The bottom 22 has a bump 30 or any other suitable structure for engaging the limiting member 12. The container 10 is formed by blow molding or may be formed in any other suitable manner. The container 10 can otherwise have any configuration, such as any of the configurations disclosed in U.S. Pat. No. 8,646,659.

Figure 2:
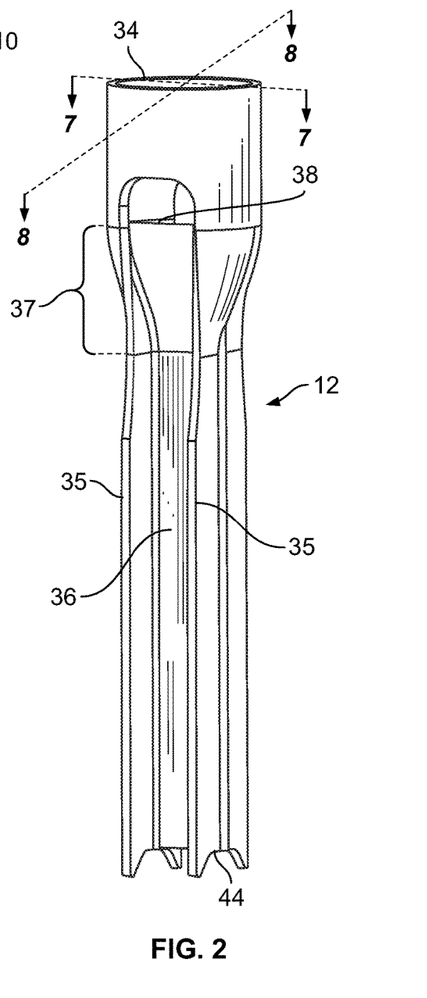
FIG. 2 is a perspective view of a limiting member for use with the vessel of FIG. 1.

FIG. 2 is a perspective view of a limiting member for use with the vessel of FIG. 1. The limiting member 12 in accordance with some embodiments of the present disclosure is adapted to stay in a fixed position with respect to the container 10 (e.g., not rotate with respect to the container 10). For example, in illustrated embodiments, the limiting member 12 may not rotate with respect to the container 10 because the limiting member is received by the bore 14 of the container 10 and extends from the bottom 22 of the container 10 to at or adjacent the top opening of the container 10. The limiting member 12 has a first end or a bottom end 44 adapted to engage the bump 30 or other structure on the bottom 22 of the container 10. The limiting member 12 has a second end or a top end 34. In some embodiments, the top end 34 may terminate in an enlarged end or enlarged ring that because of its size is unable to pass through the neck 24 of the container 10 when the limiting member 12 is inserted into the bore 14. In other embodiments, the top end 34 of the limiting member 12 may terminate in an enlarged end or enlarged ring that is designed to pass through the neck 24 of the container 10, or that is design to fit snugly within the neck 24 of the container 10, when the limiting member 12 is inserted into the bore 14.

Thus, the limiting member 12 can be inserted into the bore 14 such that it is received by the bore along the axial length of the container 10, with one end of the limiting member 12 engaged with the bottom 22 of the container 10 and the other end of the limiting member 12 engaged with the neck 24 at or adjacent the top opening of the container 10. The top end 34 defines an opening for passing product from the bore 14 to the dispensing closure for dispensing. The limiting member 12 may also include one or more prongs or other structure for transitioning the limiting member 12 to its top end 34.

The limiting member 12 includes suitable structure for engaging the bump 30 or other structure at the bottom of the container 10. For example, the limiting member 12 may comprise one or more rigid members 35 (such as the pair of rigid members 35 illustrated in FIG. 2) extending within the bore 14 and one or more interconnecting members 36 (such as a beam interconnecting member as shown in in FIG. 2) extending substantially perpendicular to and interconnecting the rigid members. The limiting member 12 therefore may have an "H-shaped" cross section such as shown in U.S. Pat. No. 8,646,659. The interconnecting member 36 may have an arcuate bottom end 44 for mating with the bump 30. The interconnecting member 36 may also have a top 36.

The limiting member 12 may have a throat section 37. The design and configuration of the throat section 37, rigid members 35, and interconnecting member 36 may be varied to achieve a desired dose of product for different types of products, bottles, closures, and limiting members. The limiting member 12 may be formed by injection molding, blow molding, thermoforming, casting, or may be formed by any other suitable manner. The limiting member 12 can otherwise have any configuration, such as any of the configurations disclosed in U.S. Pat. No. 8,646,659.

Figure 3:
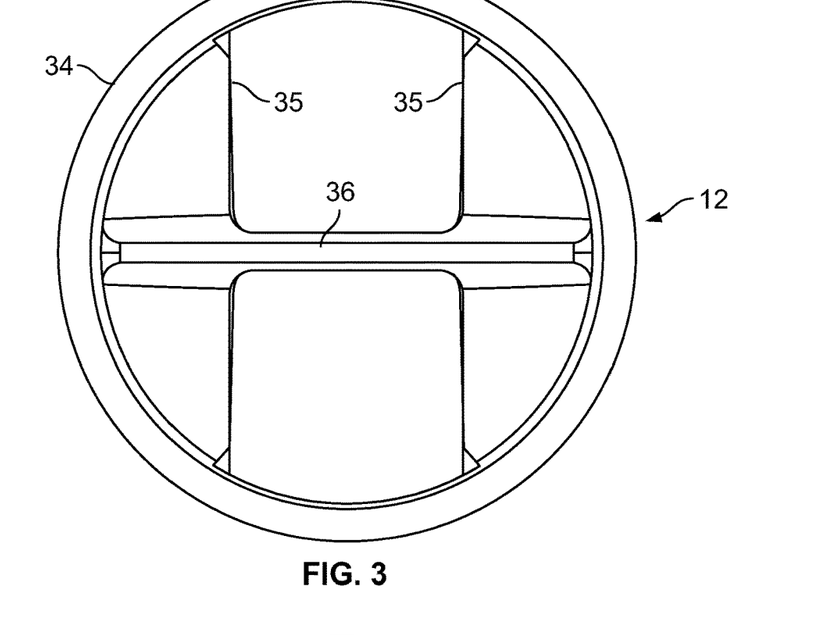
FIG. 3 is a top view of the limiting member of FIG. 2.

FIG. 3 is a top view of the limiting member of FIG. 2. FIG. 3 illustrates a limiting member 12, according to some embodiments, with a bottom end 44, top end 34, rigid members 35, interconnecting member 36 with a top 38, a throat section 37.

Figure 4:
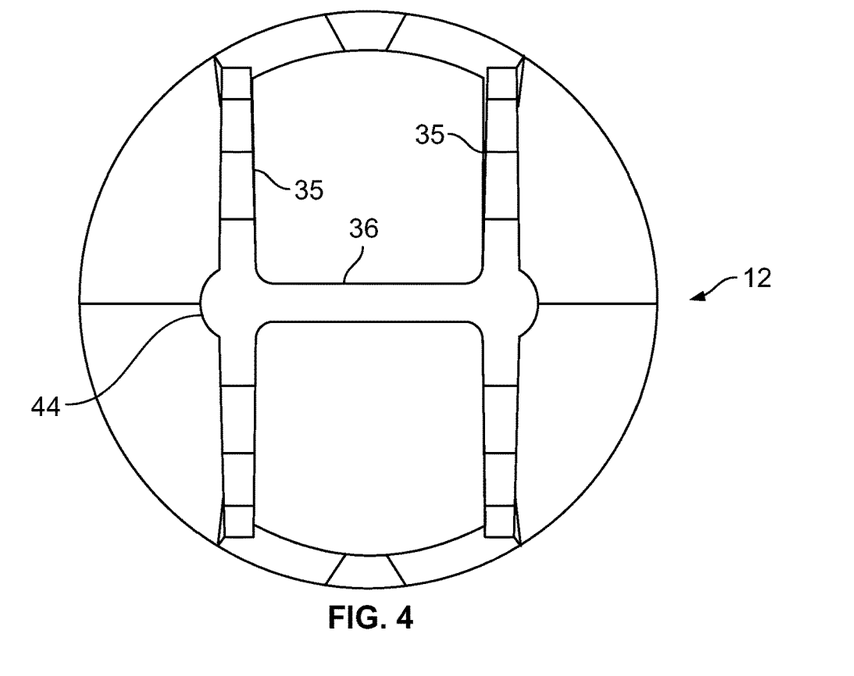
FIG. 4 is a bottom view of the limiting member of FIG. 2.

FIG. 4 is a bottom view of the limiting member of FIG. 2. FIG. 4 illustrates a limiting member 12 with a bottom end 44, rigid members 35, an interconnecting member 36.

Figure 5:
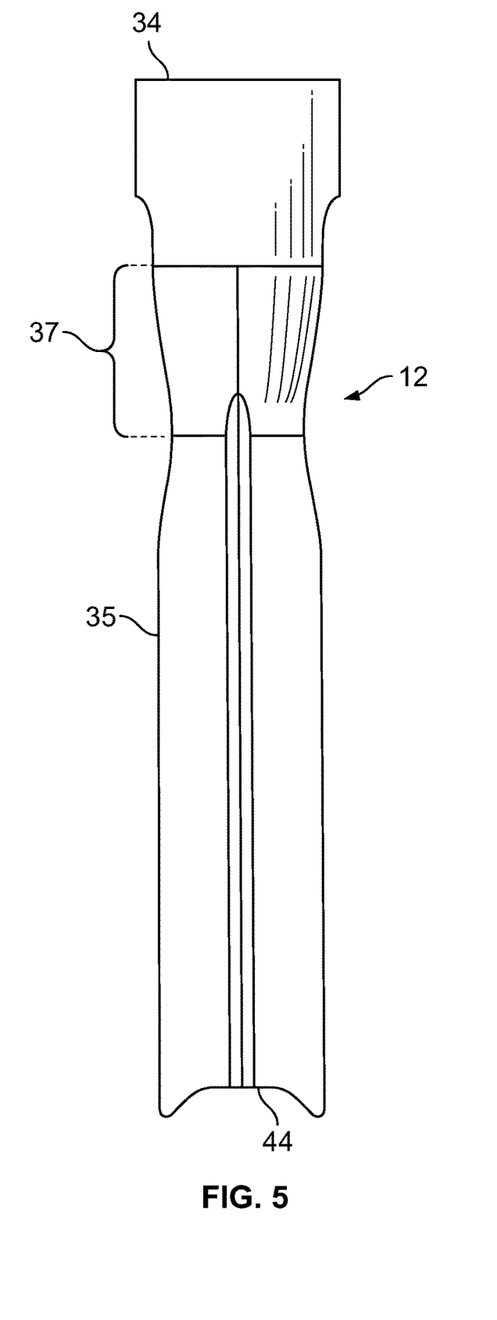
FIG. 5 is a left view of the limiting member of FIG. 2, with the right view of the limiting member being a mirror image of FIG. 5.

FIG. 5 is a left view of the limiting member of FIG. 2, with the right view of the limiting member being a mirror image of FIG. 5. FIG. 5 illustrates a limiting member 12 with a top end 34, a bottom end 44, a rigid member 35, and a throat section 37.

Figure 6:
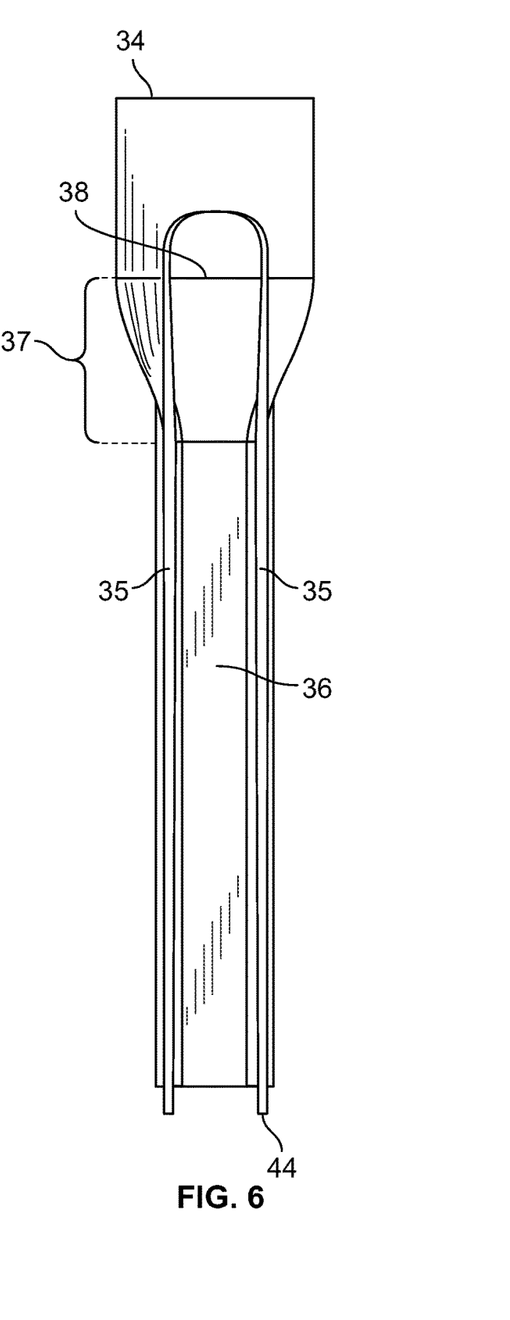
FIG. 6 is a front view of the limiting member of FIG. 2, with the back view of the limiting member being a mirror image of FIG. 6.

FIG. 6 is a front view of the limiting member of FIG. 2, with the back view of the limiting member being a mirror image of FIG. 6. FIG. 6 illustrates a limiting member 12 with a top end 34, a bottom end 44, rigid members 35, an interconnecting member 36 with a top 38, and a throat section 37.

Figure 7:
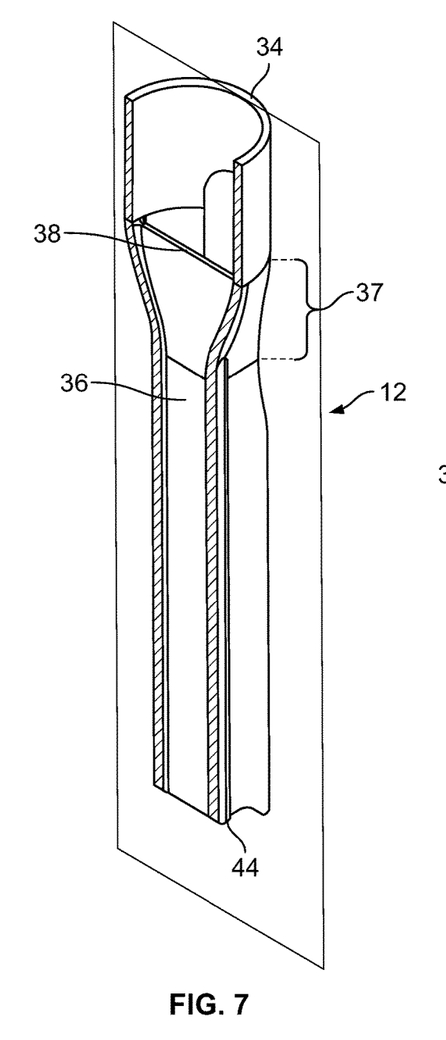
FIG. 7 is a cross-section view of the limiting member of FIG. 2 along the line 7-7.

FIG. 7 is a cross-section view of the limiting member of FIG. 2 along the line 7-7. FIG. 7 illustrates a limiting member 12 with a top end 34, a bottom end 44, an interconnecting member 36 with a top 38 and a throat section 37.

Figure 8:
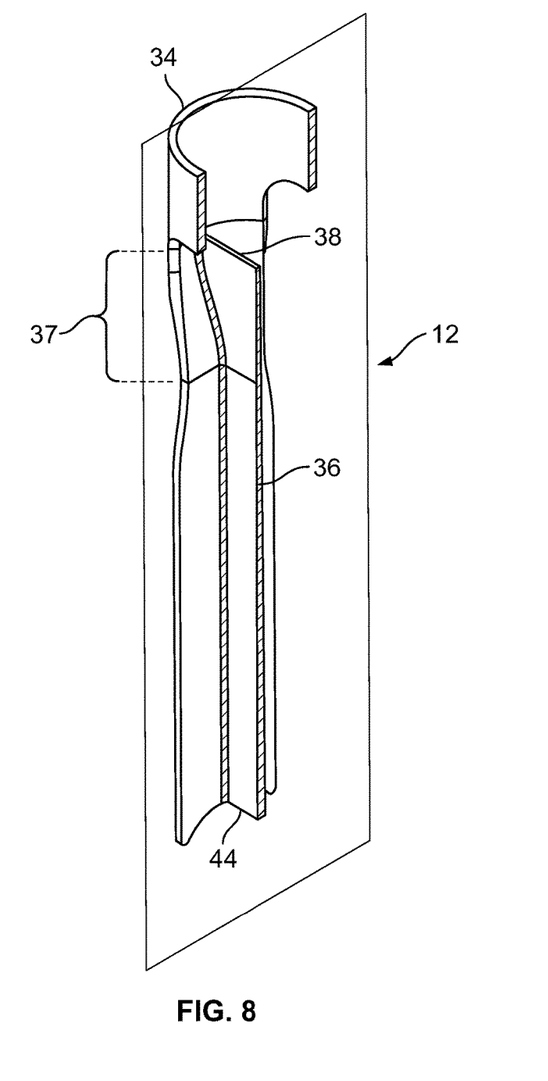
FIG. 8 is a cross-section view of the limiting member of FIG. 2 along the line 8-8.

FIG. 8 is a cross-section view of the limiting member of FIG. 2 along the line 8-8. FIG. 8 illustrates a limiting member 12 with a top end 34, a bottom end 44, an interconnecting member 36 with a top 38, and a throat section 37.

Figure 9:
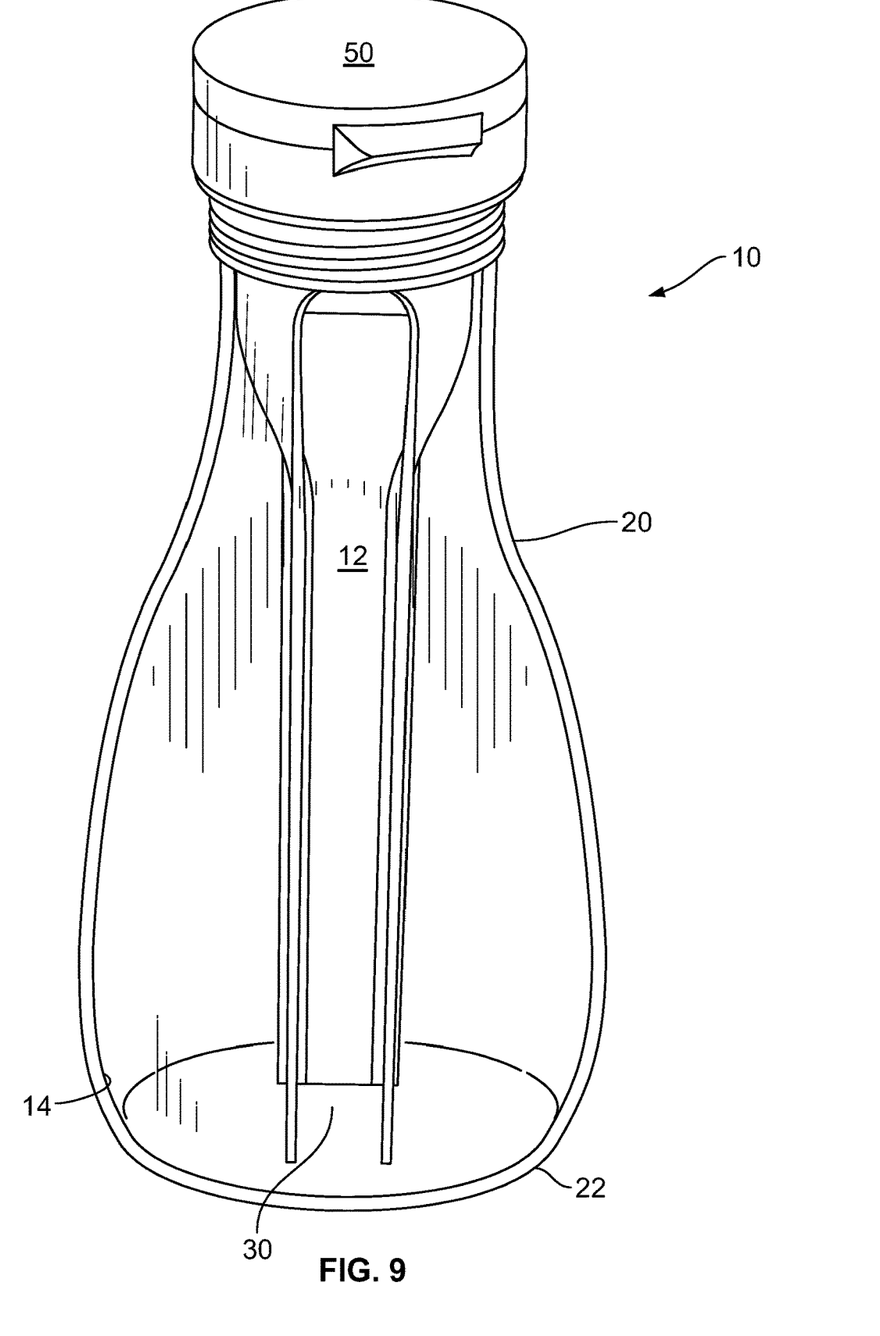
FIG. 9 is a perspective view of the vessel and limiting member of FIG. 1.

FIG. 9 is a perspective view of the vessel and limiting member of FIG. 1. FIG. 9 illustrates a vessel 10 with a limiting member 12, a bore 14, a peripheral wall 20, a bottom 22, a bump 30, and a dispensing closure 50.

The dispensing closure 50 may be in the form of a cap configured to engage a top of the container 10 and the top end 34 by snap fit or otherwise in any suitable manner. When such engagement occurs, the limiting member 12 is positioned in a stationary position within the bore 14, extending from the dispensing closure 50 to the bottom 22 of the container 10. The opening of the top end 34 of the limiting member 12 is in flow communication with a dispensing opening of the dispensing closure 50. The dispensing closure 50 may, for example, have a hinged overcap and a sealing rim such as the structure shown in U.S. Pat. No. 8,646,659. The dispensing closure 50 may be formed by injection molding or may be formed in any other suitable manner. The dispensing closure 50 can otherwise have any configuration, such as any of the configurations disclosed in U.S. Pat. No. 8,646,659.

After the vessel is assembled and contains product, it may be wrapped in shrink wrap. In some embodiments, when the dispensing closure (or cap) is opened, the limiting member 12 is configured to allow for, but limit, the displacement of product from the container 10 into the dispensing closure during squeezing of the container 10 and to thereby cause the dispensing closure to dispense a predetermined amount of product from the vessel each time the container 10 is squeezed in substantially the same manner as the vessel disclosed in U.S. Pat. No. 8,646,659. In other embodiments, when the cap is opened, the limiting member 12 is configured to allow for, but limit, the displacement of product from the container 10 through the dispensing closure during squeezing of the container 10 and to thereby cause the dispensing closure to dispense a predetermined amount of product from the vessel each time the container 10 is squeezed in substantially the same manner as the vessel disclosed in U.S. Pat. No. 8,646,659.

Accordingly, the vessel in accordance with the present disclosure provides many of the same important benefits provided by U.S. Pat. No. 8,646,659. For example, the vessel in accordance with one or more embodiments of the present disclosure is able to repeatedly dispense substantially the same amounts of product during each activation. The limiting member 12 limits the volume that can be dispensed by the user and avoids over dispensing of the product. Thus, in some embodiment, the vessel may be used to dispense the predetermined amounts for individual uses or application.

However, in some embodiments, the vessel may instead or in addition be used to dispense a predetermined amount that is dispensed in multiples. For example, if the vessel dispenses one ounce of liquid and four ounces are desired, the user may squeeze the container 10 four times before use or application of the product. The vessel in accordance with embodiments of the present disclosure may be used for any product, including, including water, soda juices and other beverages, condiments, extracts, creams, ointments, cleaners, oils, detergents and any other suitable consumer products, industrial products, etc. The vessel may also be used to control doses of medication and thus also has important applications in the medical and health care industries. The vessel in accordance with the present disclosure may be easy and cost effective to manufacture.

In addition, however, because it is a separate component and due to the manner it is secured in the container 10, the limiting member 12 can be used with a container 10 that is constructed by blow molding, which provides additional manufacturing and versatility benefits. Thus, for example, the limiting member 12 and the cap can be formed by injection molding and can be used with the blow molded container 10.

The present disclosure also includes a method of constructing the vessel including inserting the inserting the limiting member 12 into the bore 14 defined by the container 10 and engaging the limiting member 12 with a bump 30 or other structure associated with the bottom 22 of the container 10 defining the bore 14; and engaging the dispensing closure with the container 10 and with the enlarged end or ring or other structure associated with the top end of the limiting member 12 by snap fit or otherwise to hold the limiting member 12 in place and such that the ring is disposed on the top side of the neck 24.

Figure 10:
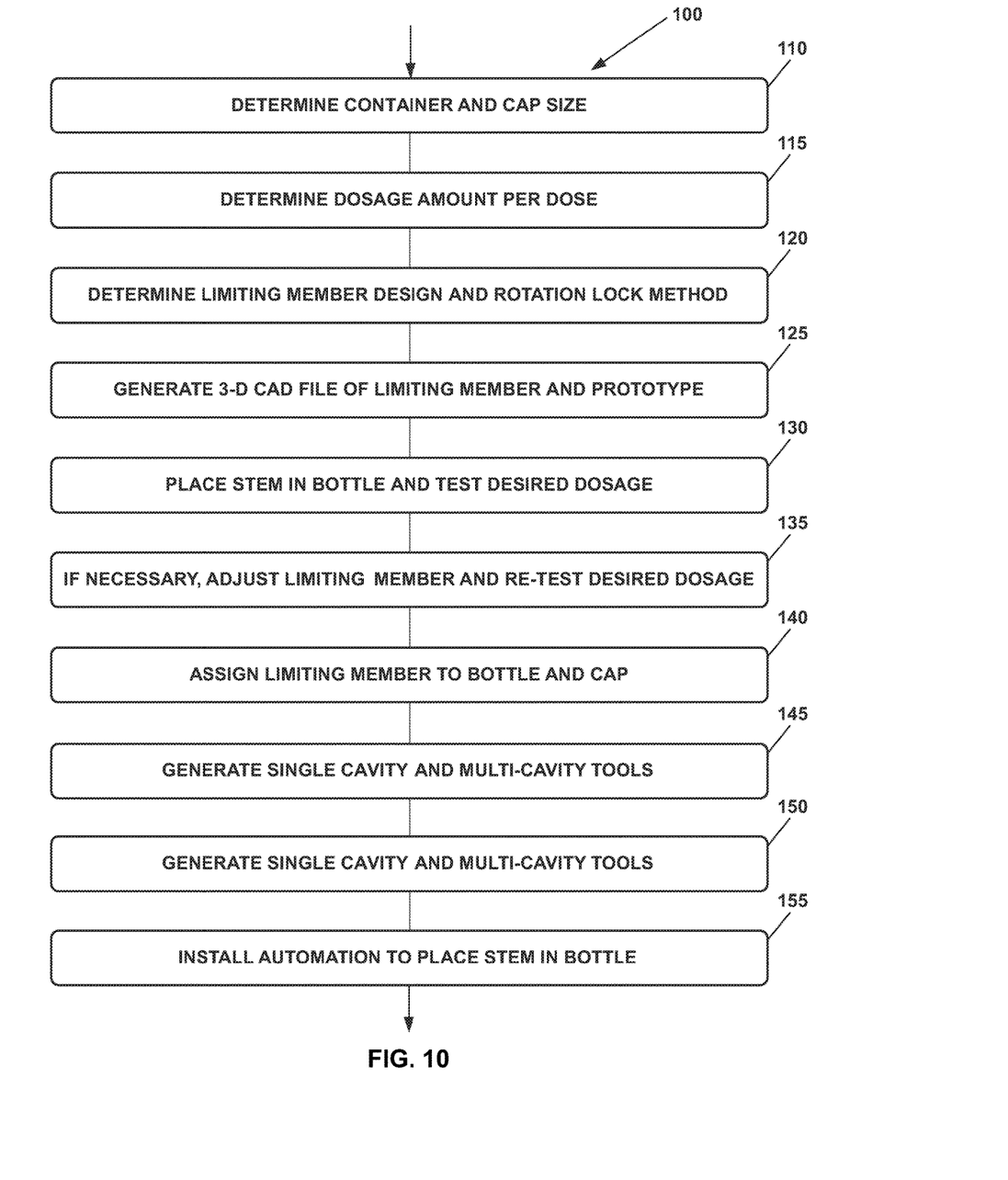
FIG. 10 is a simplified flow diagram of at least one embodiment of a method for assembling a container that dispenses predetermined amounts of product is shown.

Referring now to FIG. 10, an illustrative method 100 for assembling a container that dispenses predetermined amounts of product is shown. Aspects of the method 100 may be embodied as computerized programs, routines, logic, and/or instructions executed by a computing device, such as a computer-aided drafting (CAD) or three-dimensional (3-D) CAD program on a computer. The terms CAD and 3-D CAD are not meant to be limiting, for example, they are not meant to be limiting to any particular file format or computerized program. Rather, any computerized programs, routines, logic, and/or instructions executed by a computing device are contemplated within the scope of this disclosure.

At 110, a container design and cap design are determined. In some embodiments, oval-shaped containers may be used. In some embodiments, a silicone valve may be used in the cap. Standard sized containers (e.g., bottles) made of polyethylene terephthalate (PET) or other common thermoplastic polymer resins may be used. Various characteristics of the container and cap may be determined, such as the height from the bottom end to the top end, shape, neck configuration, bump or dimple design, throat configuration, cap configuration, threading, fitting, and/or other lengths, widths, heights, thicknesses, and depths.

At 115, the dosage amount per dose is determined. As an example, a dosage amount of 20 milliliters (mL) may be desired for each dose for an 8 ounce (oz) container. At 120, the limiting member design and rotation lock method are determined. These designs may take into consideration various characteristics of the product (e.g., viscosities of liquids). The limiting member may be size and shaped to fit into the determined container. For example, the interconnecting member of the limiting member may extend from the bottom of the bottle to the top of the container (or to other container locations). The design of the limiting member, such as the design and distances between the rigid members and the interconnecting members, the top of the interconnecting member, the throat section, the top end, and the bottom end, among other considerations, may all affect the limiting member design. Additionally, the rotation of the limiting member may be locked with respect to one or more components (e.g., the container or the cap). In some embodiments, the limiting member may lock position with respect to the container via the bump at the bottom of the container connecting to an arcuate bottom end of the limiting member. In some embodiments, the limiting member may include a tab that limits rotation with respect to one or more components of the container. In some embodiments, the limiting member may couple to the container to limit rotation of the limiting member. For example, the top end of the limiting member may couple to the neck or the top opening of the container.

At 125, a CAD file is generated of the limiting member and a prototype limiting member is produced based on the CAD file. The CAD file may be a 3-D CAD file. At 130, the prototype limiting member is placed in the container and testing is performed to determine the accuracy of the desired dose. At 135, if the accuracy of the desired dose is not within an acceptable range, the limiting member's characteristics are adjusted in the CAD file (e.g., adding or removing length, width, height, and/or depth to the interconnecting member, adjusting the throat design, adjusting the top end, etc.). One or more additional prototype limiting members may be generated and tested until the accuracy of the desired dose is within an acceptable range.

At 140, the limiting member is assigned (e.g., via a database or other computer program) to the specific container and cap configurations for the desired dosage. At 145, a single cavity tool is produced for product introduction, for example, to assist with establishing requirements for mass production. At 150, a multi-cavity tool is produced to meet mass production demands. At 155, automation equipment is installed to place the limiting member in the container before product filling occurs.

While embodiments have been illustrated and described in the drawings and foregoing description, such illustrations and descriptions are considered exemplary and not restrictive in character, it being understood that only illustrative embodiments have been shown and described and that all changes and modifications that come within the spirit of the invention are desired to be protected. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure.

What is claimed is:

1. A vessel configured to contain a powder, semi-solid or liquid product and to dispense predetermined amounts of the product, the vessel comprising a dispensing closure defining a flow opening;

a blow molded container non-integral with the closure and engageable with the dispensing closure, the container defining a bore for receiving the product, the container having a relaxed state, the container being squeezable to inwardly deflect the container from its relaxed state to displace some of the product from the container into the dispensing closure for dispensing through the flow opening one of the predetermined amounts of the product and being flexible to return to its relaxed state after the squeezing, the container thereafter being squeezable to inwardly deflect the container from its relaxed state to displace some more of the product from the container into the dispensing closure for dispensing an other of the predetermined amounts of product through the flow opening and being flexible to return to its relaxed state after the squeezing; and an elongated rigid member non-integral with the dispensing closure and the blow molded container, the elongated rigid member receivable within the bore and engagable with the blow molded container and the dispensing closure, the elongated rigid member for limiting inward deflection of the container during each squeezing of the container to limit the amount of product displaced from the container into the dispensing closure;

wherein the container has a bottom defining the bore, the bottom including a bump for engaging the elongated rigid member.

2. The vessel of claim 1 wherein the dispensing closure is formed by injection molding.

3. The vessel of claim 1 wherein the elongated rigid member is formed by injection molding.

4. The vessel of claim 1 wherein the elongated rigid member has a length that extends in substantially the same direction as a longitudinal axis of the container.

5. The vessel of claim 1 wherein the elongated rigid member has an H-shaped cross section substantially along its length.

6. The vessel of claim 1 wherein the elongated rigid member includes structure for engaging a bottom of the container.

7. The vessel of claim 1 wherein the container has a top opening and the elongated rigid member includes a top end having a ring for engaging the container adjacent the top opening.

8. The vessel of claim 7 wherein the dispensing closure is engageable with the ring.

9. The vessel of claim 1 wherein the elongated rigid member has a width that extends generally perpendicular to a longitudinal axis of the vessel, the elongated rigid member is configured to contact the container during squeezing of the container to limit the inward deflection of the container.

10. The vessel of claim 9 wherein the rigid member has a length that extends in substantially the same direction as a longitudinal axis of the vessel.

11. The vessel of claim 9 wherein the elongated rigid member includes two rigid members.

12. The vessel of claim 11 wherein the rigid members are substantially parallel to each other and wherein the elongated rigid member further includes an interconnecting member interconnecting the two rigid members.

13. A vessel configured to contain a powder, semi-solid or liquid product and to dispense predetermined amounts of the product, the vessel comprising a dispensing closure defining a flow opening;

a blow molded container non-integral with the closure and engageable with the dispensing closure, the container defining a bore for receiving the product, the container having a relaxed state, the container being squeezable to inwardly deflect the container from its relaxed state to displace some of the product from the container into the dispensing closure for dispensing through the flow opening one of the predetermined amounts of the product and being flexible to return to its relaxed state after the squeezing, the container thereafter being squeezable to inwardly deflect the container from its relaxed state to displace some more of the product from the container into the dispensing closure for dispensing an other of the predetermined amounts of product through the flow opening and being flexible to return to its relaxed state after the squeezing; and an elongated rigid member non-integral with the dispensing closure and the blow molded container, the elongated rigid member receivable within the bore and engagable with the blow molded container and the dispensing closure, the elongated rigid member for limiting inward deflection of the container during each squeezing of the container to limit the amount of product displaced from the container into the dispensing closure;

wherein a bottom includes a bump and the elongated rigid member includes a rigid member defining an arcuate opening for engaging the bump.

14. A vessel configured to contain a powder, semi-solid or liquid product and to dispense predetermined amounts of the product, the vessel comprising a dispensing closure defining a flow opening;

a blow molded container non-integral with the closure and engageable with the dispensing closure, the container defining a bore for receiving the product, the container having a relaxed state, the container being squeezable to inwardly deflect the container from its relaxed state to displace some of the product from the container into the dispensing closure for dispensing through the flow opening one of the predetermined amounts of the product and being flexible to return to its relaxed state after the squeezing, the container thereafter being squeezable to inwardly deflect the container from its relaxed state to displace some more of the product from the container into the dispensing closure for dispensing an other of the predetermined amounts of product through the flow opening and being flexible to return to its relaxed state after the squeezing; and a limiting member non-integral with the dispensing closure and the blow molded container, the limiting member receivable within the bore and engagable with the blow molded container and the dispensing closure, the limiting member for limiting inward deflection of the container during each squeezing of the container to limit the amount of product displaced from the container into the dispensing closure;

wherein the container has a bottom defining the bore, the bottom including a bump for engaging the limiting member.

15. A vessel configured to contain a powder, semi-solid or liquid product and to dispense predetermined amounts of the product, the vessel comprising a dispensing closure defining a flow opening;

a blow molded container non-integral with the closure and engageable with the dispensing closure, the container defining a bore for receiving the product, the container having a relaxed state, the container being squeezable to inwardly deflect the container from its relaxed state to displace some of the product from the container into the dispensing closure for dispensing through the flow opening one of the predetermined amounts of the product and being flexible to return to its relaxed state after the squeezing, the container thereafter being squeezable to inwardly deflect the container from its relaxed state to displace some more of the product from the container into the dispensing closure for dispensing an other of the predetermined amounts of product through the flow opening and being flexible to return to its relaxed state after the squeezing; and a limiting member non-integral with the dispensing closure and the blow molded container, the limiting member receivable within the bore and engagable with the blow molded container and the dispensing closure, the limiting member for limiting inward deflection of the container during each squeezing of the container to limit the amount of product displaced from the container into the dispensing closure;

wherein a bottom includes a bump and the limiting member includes a rigid member defining an arcuate opening for engaging the bump.

\* \* \* \* \*